(12) United States Patent
Lee et al.

(10) Patent No.: US 8,017,088 B2
(45) Date of Patent: Sep. 13, 2011

(54) FUEL REFORMER

(75) Inventors: Sung-Chul Lee, Suwon-si (KR);
Ju-Yong Kim, Suwon-si (KR);
Chan-Ho Lee, Suwon-si (KR);
Dong-Myung Suh, Suwon-si (KR);
Jin-Kwang Kim, Suwon-si (KR);
Jin-Goo Ahn, Suwon-si (KR);
Man-Seok Han, Suwon-si (KR);
Yong-Kul Lee, Suwon-si (KR);
Dong-Uk Lee, Suwon-si (KR); Leonid Gorobinskiy, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 940 days.

(21) Appl. No.: 11/528,976

(22) Filed: Sep. 27, 2006

(65) Prior Publication Data

US 2007/0072950 A1 Mar. 29, 2007

(30) Foreign Application Priority Data

Sep. 27, 2005 (KR) .................. 10-2005-0089814
Feb. 3, 2006 (KR) .................. 10-2006-0010566

(51) Int. Cl.
*B01J 8/04* (2006.01)
(52) U.S. Cl. ........ 422/190; 422/187; 422/188; 422/189; 422/191; 422/198; 422/211; 422/177; 48/61; 429/17; 423/648.1
(58) Field of Classification Search .......... 422/188–191, 422/193, 198, 200, 213; 423/648.1; 429/19
See application file for complete search history.

(56) References Cited

U.S. PATENT DOCUMENTS

| | | | |
|---|---|---|---|
| 4,147,136 A * | 4/1979 | Noguchi et al. .................. 123/3 |
| 6,506,359 B1 | 1/2003 | Maruko | |
| 6,911,187 B2 | 6/2005 | Maruko | |

(Continued)

FOREIGN PATENT DOCUMENTS

JP 6-48701 2/1994

(Continued)

OTHER PUBLICATIONS

Patent Abstracts of Japan, Publication No. 06-048701; Date of Publication: Feb. 22, 1994; in the name of Yoshimasa Fujimoto et al.

(Continued)

*Primary Examiner* — Kaity V. Handal
(74) *Attorney, Agent, or Firm* — Christie, Parker & Hale, LLP

(57) ABSTRACT

A fuel reformer including a first pipe, a second pipe which is disposed in the first pipe, a main heat source, which includes an oxidation catalyst, filling the second pipe adapted to generate thermal energy with a predetermined temperature range through an oxidation reaction of a fuel using the oxidation catalyst; an auxiliary heat source which includes a torch connected to the second pipe to ignite and burn the gaseous fuel, thereby preheating the oxidation catalyst to within a reaction starting temperature range, and a reforming reaction unit which includes a reforming catalyst filling a space between the first and second pipes to generate a reforming gas containing hydrogen through the reforming reaction of the fuel using the reforming catalyst by using the thermal energy generated by the main heat source.

14 Claims, 8 Drawing Sheets

U.S. PATENT DOCUMENTS

| | | | |
|---|---|---|---|
| 7,531,255 B2 * | 5/2009 | Nomura et al. | 429/20 |
| 7,797,928 B2 | 9/2010 | Friedrich et al. | |
| 2002/0132147 A1 | 9/2002 | Gao | |
| 2002/0168308 A1 * | 11/2002 | Loffler et al. | 422/211 |
| 2003/0049184 A1 * | 3/2003 | Kimata et al. | 422/188 |
| 2003/0161768 A1 | 8/2003 | Kawamoto et al. | |
| 2004/0237303 A1 * | 12/2004 | Maude | 29/890 |
| 2005/0191532 A1 | 9/2005 | Kim et al. | |
| 2005/0271907 A1 | 12/2005 | Kim et al. | |
| 2006/0096282 A1 * | 5/2006 | Friedrich et al. | 60/299 |

FOREIGN PATENT DOCUMENTS

| | | |
|---|---|---|
| JP | 2001-155756 | 6/2001 |
| JP | 2002-160002 | 6/2002 |
| JP | 2002-208426 | 7/2002 |
| JP | 2003-95610 | 4/2003 |
| JP | 2003-327405 | 11/2003 |
| JP | 2004-323353 | 11/2004 |
| JP | 2005-243649 | 9/2005 |
| KR | 1996-0034070 | 10/1996 |
| KR | 2002-0092373 | 12/2002 |
| KR | 10-2005-0116436 | 12/2005 |
| KR | 10-2006-0000426 | 1/2006 |
| WO | WO 01/64577 A1 | 9/2001 |
| WO | WO 2004/099577 A1 | 11/2004 |

OTHER PUBLICATIONS

Patent Abstracts of Japan, Publication No. 2003-095610; Date of Publication: Apr. 3, 2003; in the name of Satonobu Yasutake et al.

Patent Abstracts of Japan, Publication No. 2004-323353; Date of Publication: Nov. 18, 2004; in the name of Toshiyasu Miura et al.

Patent Abstracts of Japan, Publication No. 2005-243649; Date of Publication: Sep. 8, 2005; in the name of Ju-Yong Kim et al.

Patent Abstracts of Japan, Publication No. 2002-208426, Published on Jul. 26, 2002, in the name of Komiya.

Patent Abstracts of Japan, Publication No. 2001-155756; dated Jun. 8, 2001; in the name of Hiroshi Fujiki.

Patent Abstracts of Japan, Publication No. 2002-160002; dated Jun. 4, 2002; in the name of Nobuki Nishimura et al.

Korean Patent Abstracts Publication No. 100314829 B1; for Korean Publication No. 1996-0034070 listed above, in the name of Jae Seong Han et al.

Korean Patent Abstracts, Publication No. 1020050116436 A; dated Dec. 12, 2005; in the name of Ju Yong Kim et al.

Korean Patent Abstracts, Publication No. 1020060000426 A; dated Jan. 6, 2006; in the name of Ju Yong Kim et al.

U.S. Office action dated Sep. 24, 2008, for related U.S. Appl. No. 11/490,754, indicating relevance of listed U.S. references and JP 2001-155756 in this IDS.

SIPO Office action dated Sep. 30, 2010, corresponding to Chinese Patent application 200810167384.0, with English translation, noting listed reference in this IDS, as well as U.S. Publication 2003/0049184 previously cited in Sep. 22, 2009 U.S. Office action for this application.

* cited by examiner

FUEL REFORMER

CROSSED-REFERENCES TO RELATED APPLICATIONS

This application claims priority to and the benefit of Korean Patent Application No. 10-2005-0089814, filed on Sep. 27, 2005, and Korean Patent Application No. 10-2006-0010566, filed on Feb. 3, 2006, in the Korean Intellectual Property Office, the entire contents of which are incorporated herein by reference.

BACKGROUND OF THE INVENTION

1. Field of the Invention

The present invention relates to a fuel reformer, and more particularly, to a fuel reformer for generating thermal energy through an oxidation reaction of a fuel.

2. Description of the Related Art

A fuel cell is constructed as a system for generating electric energy using a fuel.

In the fuel cell, a polymer electrolyte membrane fuel cell has an excellent output characteristic, a low operating temperature, and fast starting and response characteristics. In addition, the polymer electrolyte fuel cell advantageously has a wide range of applications including a mobile power source for vehicles, a distributed power source for home or buildings, and a small-sized power source for electronic apparatuses.

The fuel cell system employing the polymer electrolyte membrane fuel cell includes a fuel cell main body, which can also be referred to as a stack, a fuel reformer which reforms the fuel to generate a reforming gas containing hydrogen and supplies the reforming gas to the fuel cell main body, and an oxidant gas supply unit which supplies an oxidant gas to the stack.

Therefore, the polymer electrolyte membrane fuel cell system generates electric energy in the stack through an electrochemical reaction between the reforming gas supplied from the fuel reformer and the oxidant gas supplied from the oxidant gas supply unit.

The fuel cell reformer may include a heat source which generates thermal energy by oxidizing a fuel using an oxidation catalyst and a reforming reaction unit which generates the reforming gas through a reforming reaction of the fuel using the thermal energy.

Here, the heat source can generate the thermal energy by oxidizing a liquid fuel such as methanol and ethanol or a gaseous fuel such as LPG and LNG. Particularly, the heat source using the liquid fuel can generate the thermal energy in a certain (or predetermined) temperature range through the oxidation reaction of the fuel using the oxidation catalyst even at room temperature.

On the other hand, because the heat source cannot generate the oxidation reaction of the gaseous fuel using the oxidation catalyst at room temperature, when a conventional fuel reformer includes the heat source that oxidizes a gaseous fuel, an additional preheater is needed for preheating the oxidation catalyst to a certain (or predetermined) temperature to enable an oxidation reaction of the gaseous fuel.

In addition, a conventional fuel reformer includes a heat source that ignites and burns a liquid fuel; and because the energy efficiency of a fuel reformer is changed by the location of the heat source, and the heat source is oxidized by the flame, the durability of the heat source deteriorates as a result. Thus, the heat source has to be frequently replaced, thereby reducing the lifespan of the fuel reformer.

SUMMARY OF THE INVENTION

An aspect of the present invention provides a fuel reformer capable of generating thermal energy through an oxidation reaction using an oxidation catalyst by preheating the oxidation catalyst by igniting and burning a fuel when a fuel cell system is initially driven.

An embodiment of the present invention provides a fuel reformer including: a first pipe; a second pipe disposed in the first pipe; a main heat source including an oxidation catalyst in the second pipe and adapted to generate thermal energy within a reforming temperature range through an oxidation reaction of a fuel using the oxidation catalyst; an auxiliary heat source including a torch connected to the second pipe to ignite and burn the gaseous fuel to preheat the oxidation catalyst to within a reaction starting temperature range; and a reforming reaction unit including a reforming catalyst in a region of a space between the first and second pipes and adapted to generate a reforming gas containing hydrogen through the reforming reaction of the fuel using the reforming catalyst by using the thermal energy generated by the main heat source.

In the above embodiment of the present invention, the fuel reformer may further include a carbon monoxide reduction unit constructed by filling another region of the space between the first and second pipes with a water gas shift catalyst to reduce a concentration of carbon monoxide contained in the reforming gas.

In addition, the fuel reformer may further include a barrier disposed between the first and second pipes to partition the space between the first and second pipes into the region filled with the reforming catalyst and the another region filled with the water gas shift catalyst.

In addition, the barrier may have a mesh shape.

In addition, the reaction starting temperature range of the oxidation catalyst may be from about 150° C. to about 300° C.

In addition, the reforming temperature range of the thermal energy generated by the main heat source may be from about 600° C. to about 700° C.

According to another embodiment of the present invention, a fuel reformer is provided to include: a reactor body including a plurality of reaction substrates (or plates) that generate thermal energy through an oxidation reaction of a first reactant including a fuel and generate a reforming gas through a reforming reaction of a second reactant including the fuel; and a preheating unit disposed in the reactor body to ignite and burn the first reactant in order to preheat the reactor body.

In the above embodiment of the present invention, the preheating unit may include: a housing for enclosing the reactor body and a burner disposed in the housing to ignite and burn the first reactant external to the reactor body.

Another embodiment of the present invention provides a fuel reformer including: one or more first reaction substrates including a plurality of first channels for allowing a first reactant including a fuel to flow and an oxidation catalyst layer formed on a surface of the first channels; one or more second reaction substrates including a plurality of second channels for allowing a second reactant including the fuel to flow and a reforming catalyst layer formed on a surface of the second channel or channels; a reactor body constructed by adhering one of the first reaction substrates to one of the second reaction substrates; and a preheating unit disposed in the reactor body to ignite and burn the first reactant in order to preheat the oxidation catalyst layer in a reaction starting temperature range.

In the above embodiment of the present invention, the reactor body may include one or more unit bodies, each of the unit bodies being constructed by adhering one of the first reaction substrates to one of the second reaction substrates.

In addition, the reactor body may include a cover plate adhered to the second reaction substrate of one of the unit bodies.

In addition, the reactor body may be constructed by successively adhering the unit bodies to one another.

In addition, the reactor body may include a cover plate adhered to a top most one of the second reaction substrates disposed at the top of the reactor body.

In addition, the preheating unit may include: a housing for enclosing the reactor body and a burner disposed in the housing to ignite and burn the first reactant external to the reactor body.

In addition, the housing may include: a first portion having a horn shape located at a first end portion of the reactor body; a second portion having a horn shape located at a second end portion of the reactor body; and a third portion adhered to the reactor body with the exception of the first end portion of the reactor body and the second end portion of the reactor body.

In addition, the reactor body may include a path constructed by using the first channels and the adhered surface of the second reaction substrate to allow the first reactant to flow, and the path may include a plurality of injection holes formed at a first end portion of the reactor body and a plurality of discharging holes formed at a second end portion of the reactor body connected with the injection holes.

In addition, the preheating unit may include: a housing for enclosing the reactor body and a burner unit disposed in the housing to ignite and burn the first reactant to spray (or inject) a flame to the injection holes.

In addition, the housing may include: a first portion having a horn shape located at a side of the injection holes; a second portion having a horn shape located at a side of the discharging holes; and a third portion adhered to the reactor body with the exception of the first end portion of the reactor body and the second end portion of the reactor body.

In addition, the burner may be disposed in the first portion.

In addition, in the housing, an injection hole for injecting the first reactant into the first portion may be formed in the first portion, and a discharging hole for discharging a combustion gas of the first reactant burned by the burner and a reaction gas of the first reactant oxidized by the oxidation catalyst layer may be formed in the second portion.

In addition, the reaction starting temperature range of the oxidation catalyst layer may be from about 150° C. to about 300° C.

In addition, the first reaction substrate may generate thermal energy with a temperature range (or a reforming temperature range) from about 600° C. to about 700° C. through the oxidation reaction of the first reactant.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following description, only certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, and not restrictive.

Figure 1:
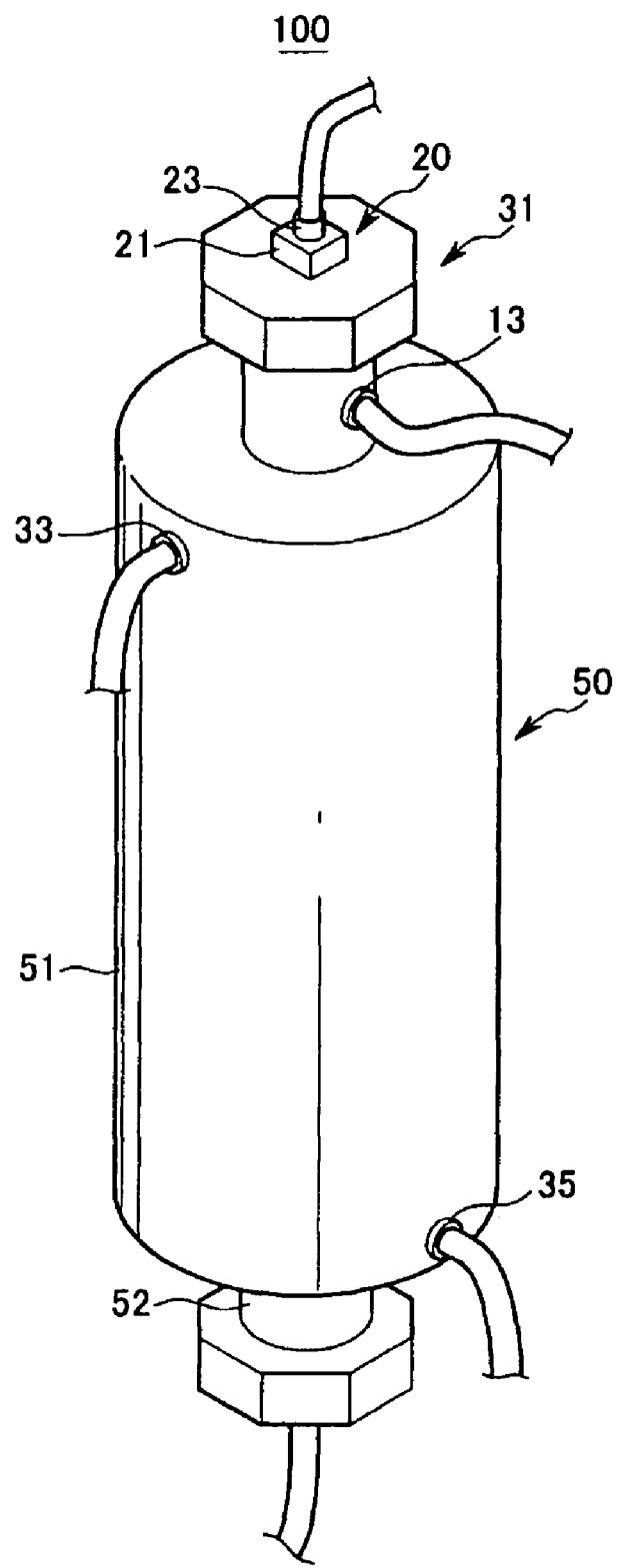
FIG. 1 is a perspective view illustrating a fuel reformer according to a first embodiment of the present invention.
Figure 2:
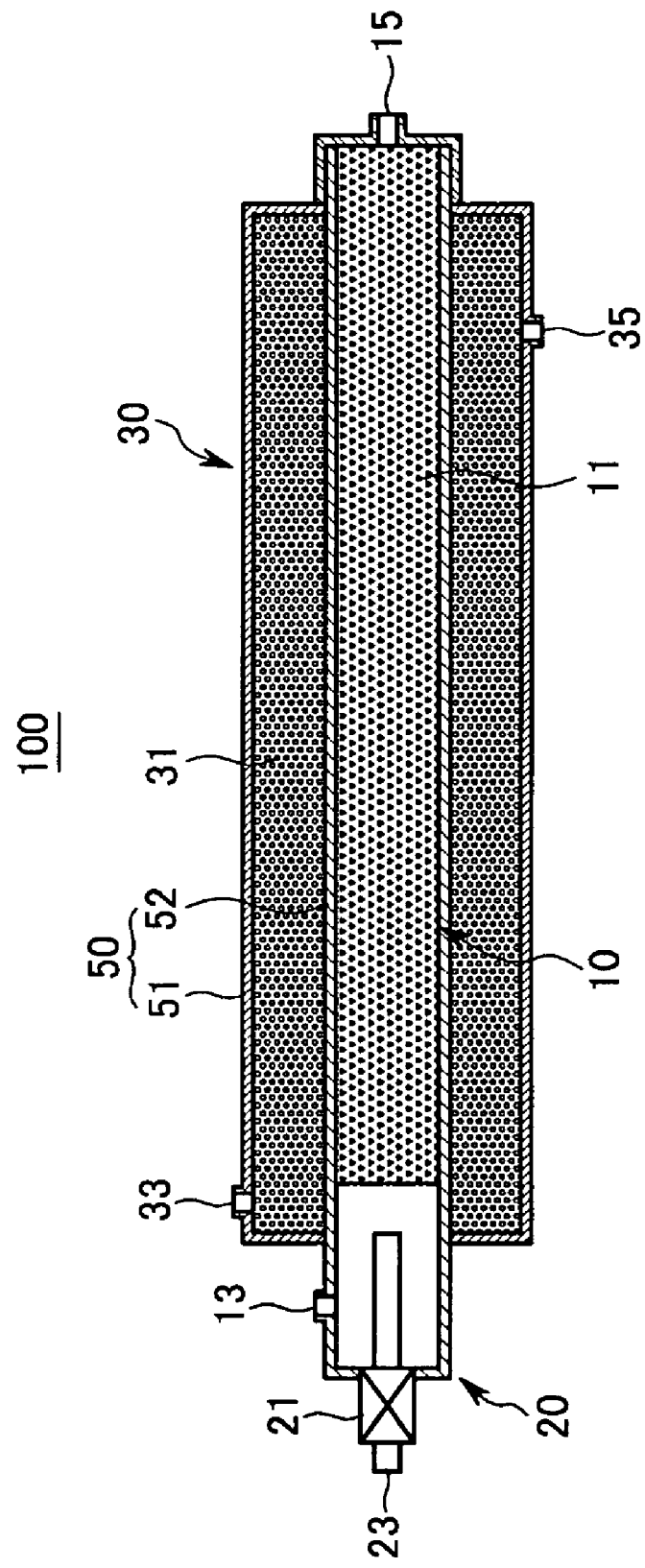
FIG. 2 is a cross sectional view of the fuel reformer shown in FIG. 1.

FIG. 1 is a perspective view illustrating a fuel reformer 100 according to a first embodiment of the present invention. FIG. 2 is a cross sectional view of the fuel reformer 100 shown in FIG. 1.

Referring to FIGS. 1 and 2, the fuel reformer 100 has a structure for burning a gaseous fuel such as LPG or LNG, or a butane gas, to generate thermal energy and to generate a reforming gas containing hydrogen through a reforming reaction of the gaseous fuel using thermal energy.

The fuel cell reformer 100 is used for a fuel cell system employing the polymer electrolyte membrane fuel cell which generates electrical energy through an oxidation reaction of the reforming gas and a reduction reaction of an oxidant gas. Therefore, the fuel cell reformer 100 has a function of supplying the reforming gas to a stack of the polymer electrolyte membrane fuel cell system.

The fuel reformer 100 includes a main heat source 10 for generating thermal energy with a certain (or predetermined) temperature range through an oxidation reaction of the gaseous fuel using an oxidation catalyst 11, an auxiliary heat source 20 for preheating the oxidation catalyst 11 of the main heat source 10 within a reaction starting temperature range, and a reforming reaction unit 30 for generating a reforming gas containing hydrogen through the reforming reaction of the gaseous fuel by a reforming catalyst 31 using the thermal energy generated by the main heat source 10.

The fuel reformer 100 includes a reformer main body 50 having a shape of a concentric double pipe. The reformer main body 50 includes a first pipe 51 and a second pipe 52 that is located in the first pipe 51.

The first pipe 51 has a cylindrical shape which has a certain (or predetermined) cross sectional area and substantially closed ends. The second pipe 52 has a cylindrical shape which has a cross sectional area smaller than that of the first pipe 51 and substantially closed ends. The first and second pipes 51 and 52 are disposed along an axial direction (a concentric axial direction) of the first pipe 51 so that an outer surface of the second pipe 52 is separated by a certain (or predetermined) interval from an inner surface of the first pipe 51.

In the fuel reformer 100, according to an embodiment, the main heat source 10 is used for generating thermal energy needed for the reforming reaction of the reforming reaction unit 30 and for supplying the thermal energy to the reforming reaction unit 30. The main heat source 10 generates the thermal energy for maintaining a temperature range (or a reforming temperature range) of from about 600° C. to about 700° C. needed for the reforming reaction of the reforming reaction unit 30.

The main heat source 10 is generated by filling the inner space of the second pipe 52 with the oxidation catalyst 11 to cause an oxidation reaction between the gaseous fuel and air using the oxidation catalyst 11 which results in the generation the thermal energy that is within the aforementioned temperature range.

The oxidation catalyst 11 is used for precipitating the oxidation reaction between the gaseous fuel and air. The oxidation catalyst 11 may have a structure where a catalytic material such as platinum (Pt) and/or ruthenium (Ru) is contained in a pellet-shaped carrier made of alumina (Al2O3), silica (SiO2), and/or titania (TiO2).

In the main heat source 10, a first injection hole 13 through which the gaseous fuel and air are injected into the second pipe is disposed at an end portion of the second pipe 52.

In addition, in the main heat source 10, a first discharging hole 15 for discharging the combustion gas generated by burning the gaseous fuel and air through the oxidation reaction between the gaseous fuel and air is disposed at the other end portion of the second pipe 52.

According to the present embodiment, the auxiliary heat source 20 is used for preheating the oxidation catalyst 11 of the main heat source 10 to within the reaction starting temperature range, when the fuel reformer 100 is initially driven.

The auxiliary heat source 20 generates the thermal energy for preheating the oxidation catalyst 11 of the main heat source 10 to within a temperature range of from about 150° C. to about 300° C., which is needed for starting the reaction, by igniting and burning gaseous fuel and air.

Because the oxidation catalyst 11 of the main heat source 10 cannot generate the oxidation reaction between the gaseous fuel and air at room temperature, when the fuel reformer 100 is initially driven, the oxidation catalyst 11 of the main heat source 10 is preheated by the auxiliary heat source 20 in order to supply thermal energy (with a temperature range in which the oxidation reaction between the gaseous fuel and air starts) to the oxidation catalyst 11 of the main heat source 10.

In one embodiment, the auxiliary heat source 20 includes a torch 21 connected to an end portion of the second pipe 52. The torch 21 has a function of igniting and burning the gaseous fuel together with air in the second pipe 52.

The torch 21 includes a suitable igniter plug (not shown) for igniting the gaseous fuel and the air.

In addition, in the auxiliary heat source 20, a second injection hole 23 for injecting the gaseous fuel and the air into the second pipe 52 is formed at the torch 21. The combustion gas generated when the gaseous fuel and air are ignited and burned in the second pipe 52 is discharged through the first discharging hole 15 of the aforementioned main heat source 10.

In an embodiment of the present invention, the reforming reaction unit 30 is constructed by filling the space between the first and second pipes 51 and 52 with the reforming catalyst 31, and accordingly, the reforming gas containing hydrogen is generated through the reforming reaction of the gaseous fuel using the reforming catalyst 31.

Here, the reforming reaction unit 30 has a structure of generating a reforming gas containing hydrogen from the fuel through a catalyst reaction such as a steam reforming reaction, a partial oxidation reaction, an auto-thermal reaction, and/or a steam reforming reaction between the fuel and water using thermal energy.

In the reforming reaction unit 30, the reforming catalyst 31 may have a structure where a catalytic material such as copper (Cu), nickel (Ni), and/or platinum (Pt) is contained in a pellet-shaped carrier made of alumina (Al2O3), silica (SiO2), and/or titania (TiO2).

In addition, in the reforming reaction unit 30, a third injection hole 33 for injecting the gaseous fuel and water into the space between the first and second pipes 51 and 52 is formed at an end portion of the first pipe 51.

In addition, in the reforming reaction unit 30, a second discharging hole 35 for discharging the reforming gas generated through the reforming reaction between the gaseous fuel and water steam using the reforming catalyst 31 in the space between the first and second pipes 51 and 52 is formed at the other end portion of the first pipe 51 from the portion where the injection hole 33 is formed.

Here, the second discharging hole 35 may be connected to the stack of the polymer electrolyte membrane fuel cell, mentioned above, through a suitable pipe line.

In an embodiment, the reforming reaction unit 30 generates the reforming gas containing hydrogen through the reforming reaction between the gaseous fuel and the water steam using the reforming catalyst 31, but the present invention is not thereby limited. The reforming reaction unit 30 may generate the reforming gas through the reforming reaction between a liquid fuel such as methanol and ethanol and the water steam.

Now, a method of driving the fuel reformer 100 according to an embodiment of the present invention will be described in more detail.

Still referring to FIGS. 1 and 2, first, when the fuel reformer 100 is initially driven, the gaseous fuel and the air are supplied into the second pipe 52 through the second injection hole 23 of the auxiliary heat source 20 that contains the torch 21.

In this state, the igniter plug (not shown) of the torch 21 ignites the air and the gaseous fuel injected into the second pipe 52. Then, the auxiliary heat source 20 generates a certain (or predetermined) amount of thermal energy and supplies the thermal energy to the oxidation catalyst 11 of the main heat source 10. Accordingly, the oxidation catalyst 11 of the main heat source 10 is preheated to within a reaction starting temperature range of from about 150° C. to about 300° C.

Subsequently, when the fuel reformer 100 is normally driven, a supply of the gaseous fuel and air to be supplied into the second pipe 52 through the second injection hole 23 of the torch 21 is stopped by the operation of a suitable valve (not shown).

When the fuel reformer 100 is normally driven, the gaseous fuel and the air are supplied into the second pipe 52 through the first injection hole 13 of the main heat source 10. Then, the main heat source 10 generates the thermal energy for maintaining the certain (or predetermined) temperature range (or the reforming temperature range) of from about 600° C. to about 700° C., which is needed for the reforming reaction in the reforming reaction unit 30, through the oxidation reaction between the gaseous fuel and the air using the preheated oxidation catalyst 11. Accordingly, the thermal energy maintaining the aforementioned temperature range is supplied to the reforming catalyst 31 of the reforming reaction unit 30 through the second pipe 52.

After the aforementioned procedures, the gaseous fuel and the water are supplied to the space between the first and second pipes 51 and 52 through the third injection hole 33 of the reforming reaction unit 30. Then, the reforming reaction unit 30 absorbs the thermal energy generated by the main heat source 10, and a steam reforming reaction between the gaseous fuel and water using the reforming catalyst 31 is performed, thereby generating the reforming gas containing hydrogen.

Accordingly, since the reforming gas is discharged through the second discharging hole 35 of the reforming reaction unit 30 and supplied to the stack, an oxidation reaction of the hydrogen contained in the reforming gas and a reduction reaction of the separately supplied air are performed in the stack to generate a certain (or predetermined) output of electric energy.

Figure 3:
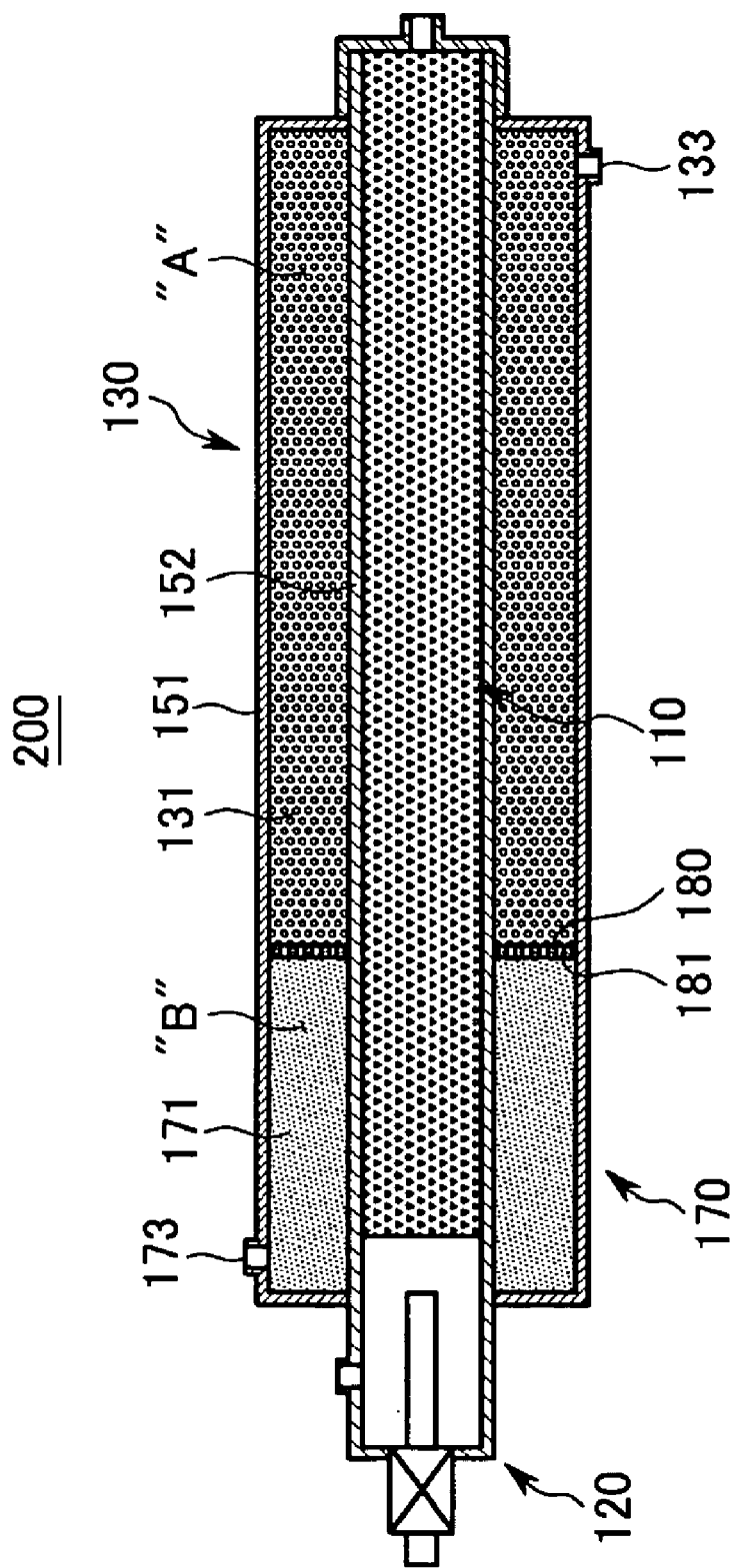
FIG. 3 is a cross sectional view of a fuel reformer according to a second embodiment of the present invention.

FIG. 3 is a cross sectional view of a fuel reformer 200 according to a second embodiment of the present invention.

Referring to FIG. 3, the fuel reformer 200 further includes a carbon monoxide reduction unit 170 for reducing a concentration of carbon monoxide contained in the reforming gas generated by a reforming reaction unit 130.

Since, like the aforementioned embodiment, the fuel reformer 200 includes a main heat source 110 and an auxiliary heat source 120, and the main heat source 110 and the auxiliary heat source 120 have substantially the same structures as those of the aforementioned embodiment of FIGS. 1 and 2, the detailed description thereof is omitted.

In the embodiment of FIG. 3, when the space between the first and second pipes 151 and 152 is partitioned into first and second regions A and B, the reforming reaction unit 130 is constructed by filling the first region A with a reforming catalyst 131.

The first and second regions A and B are partitioned by a barrier 180 having a mesh shape. The barrier 180 includes a plurality of holes 181 and has the shape of a ring where the second pipe 152 passes through a central portion thereof. In addition to the function of partitioning the inner space between the first and second pipes 151 and 152 into the first and second regions A and B, the barrier 180 has a function of allowing the reforming gas generated by the reforming reaction unit 130 to flow into the carbon monoxide reduction unit 170, described in more detail below, through the aforementioned holes 181.

In addition, according to this embodiment, in the reforming reaction unit 130, an injection hole 133 for injecting the gaseous fuel and the water into the first region A is formed at an end portion of the first pipe 151.

In this embodiment, the carbon monoxide reduction unit 170 is constructed by filling the second region B between the first and second pipes 151 and 152 with a water gas shift catalyst 171.

The water gas shift catalyst 171 precipitates the water gas shift reaction of carbon monoxide contained in the reforming gas to reduce the concentration of carbon monoxide. The water gas shift catalyst 171 may be constructed by containing a catalytic material such as copper (Cu), zinc (Zn), iron (Fe), and/or chromium (Cr) in a pellet-shaped carrier made of alumina (Al2O3), silica (SiO2), and/or titania (TiO2).

In the carbon monoxide reduction unit 170, a discharging hole 173 for discharging the reforming gas, of which the concentration of carbon monoxide is reduced, from the second region B is formed at the other end portion of the first pipe 151 from the injection hole 133. The discharging hole 173 may be connected to the stack (not shown) of the polymer electrolyte membrane fuel cell, mentioned above, through a suitable pipe line.

In a method of driving the fuel reformer 200 according to this embodiment of the present invention, when the reforming gas is generated by the reforming reaction unit 130 as in the aforementioned embodiment of FIGS. 1 and 2, the reforming gas is further supplied to the carbon monoxide reduction unit 170 (that is the second region B between the first and second pipes 151 and 152) through the holes 181 of the barrier 180.

Accordingly, in the carbon monoxide reduction unit 170, additional hydrogen is concentrated (or generated) through the water gas shift reaction of the carbon monoxide contained in the reforming gas using the water gas shift reaction catalyst 171, and the concentration of carbon monoxide is reduced at the same time. The reforming gas in which the concentration of carbon monoxide has been reduced is discharged through the discharging hole 173 of the carbon monoxide reduction unit 170 and supplied to the stack.

Since other components and operations of the fuel reformer 200 according to this embodiment are substantially the same as those of the aforementioned fuel cell reformer 100 referred to in FIGS. 1 and 2 according to the first embodiment, detailed description thereof is omitted.

Figure 4:
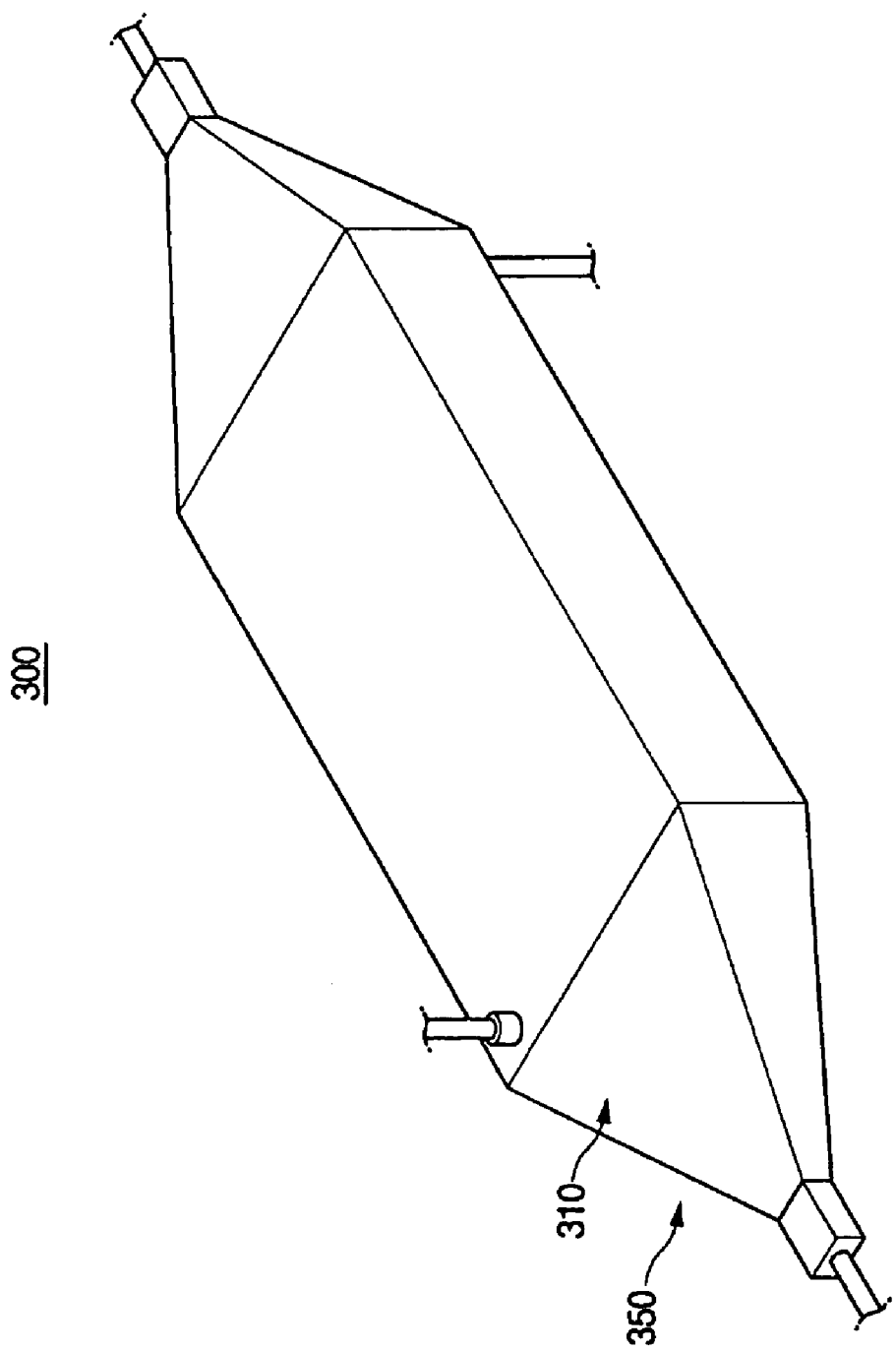
FIG. 4 is a perspective view illustrating a fuel reformer according to a third embodiment of the present invention.

FIG. 4 is a perspective view illustrating a fuel reformer 300 according to a third embodiment of the present invention.

Referring to FIG. 4, the fuel reformer 300 generates thermal energy with a certain (or predetermined) temperature range through the oxidation reaction between the gaseous fuel and the air (hereinafter also referred to as "first reactants"). The fuel reformer 300 includes a reactor body 310 in which the reforming gas is generated through the reforming reaction between the gaseous fuel and the water (hereinafter also referred to as "second reactants") using the thermal energy.

Figure 5:
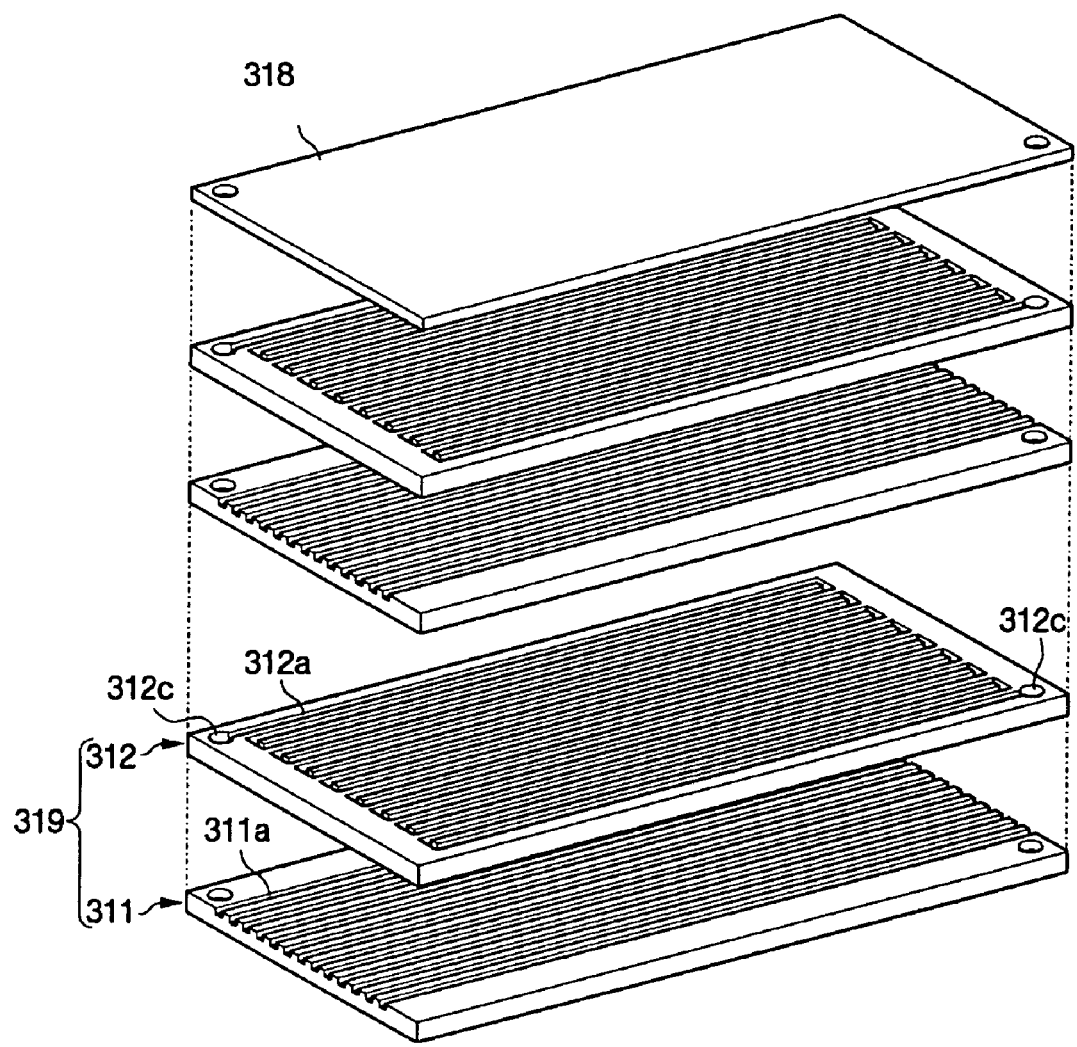
FIG. 5 is an exploded perspective view of a reactor body of the fuel reformer shown in FIG. 4.
Figure 6:
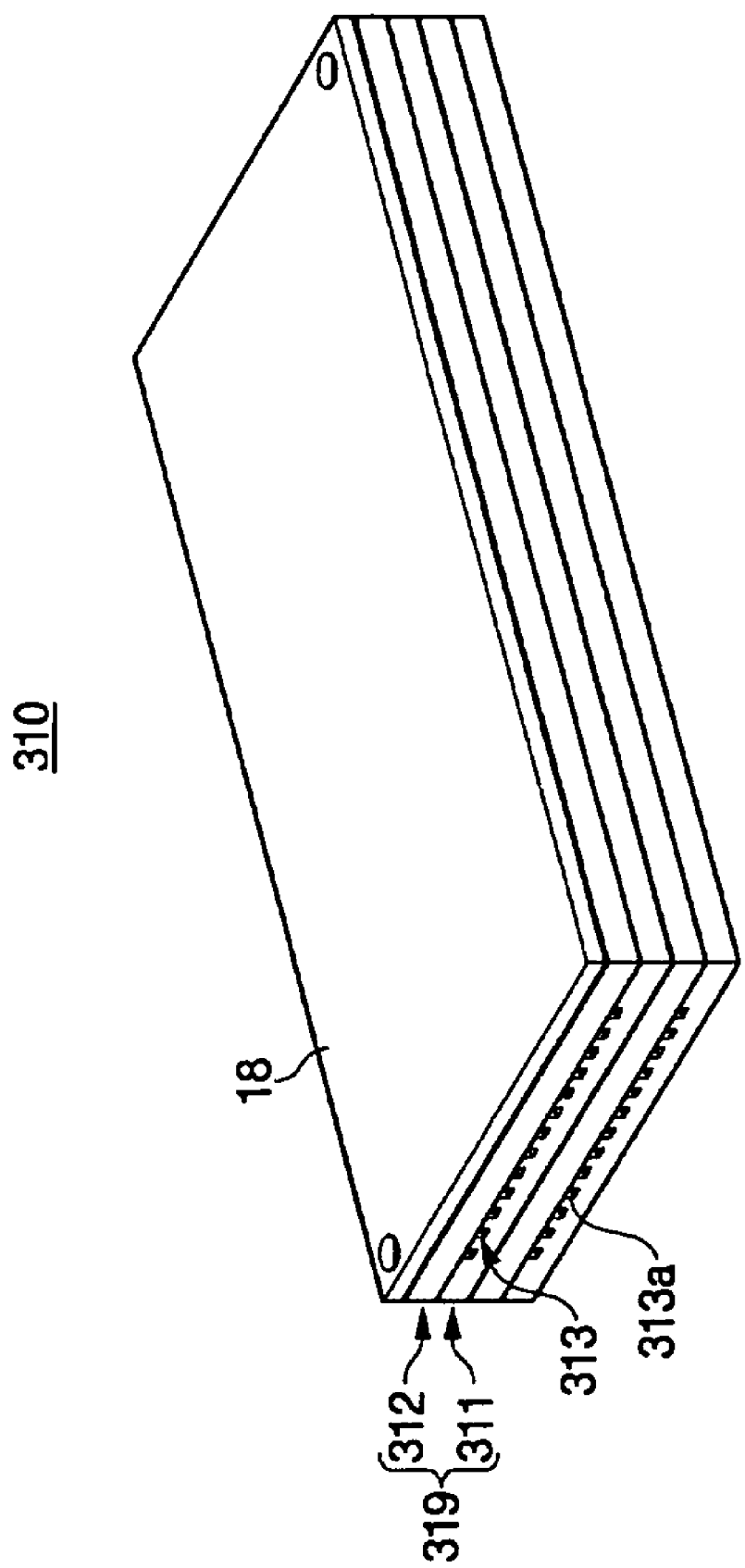
FIG. 6 is a perspective view showing a structure in which the reactor body shown in FIG. 4 is combined.
Figure 7:
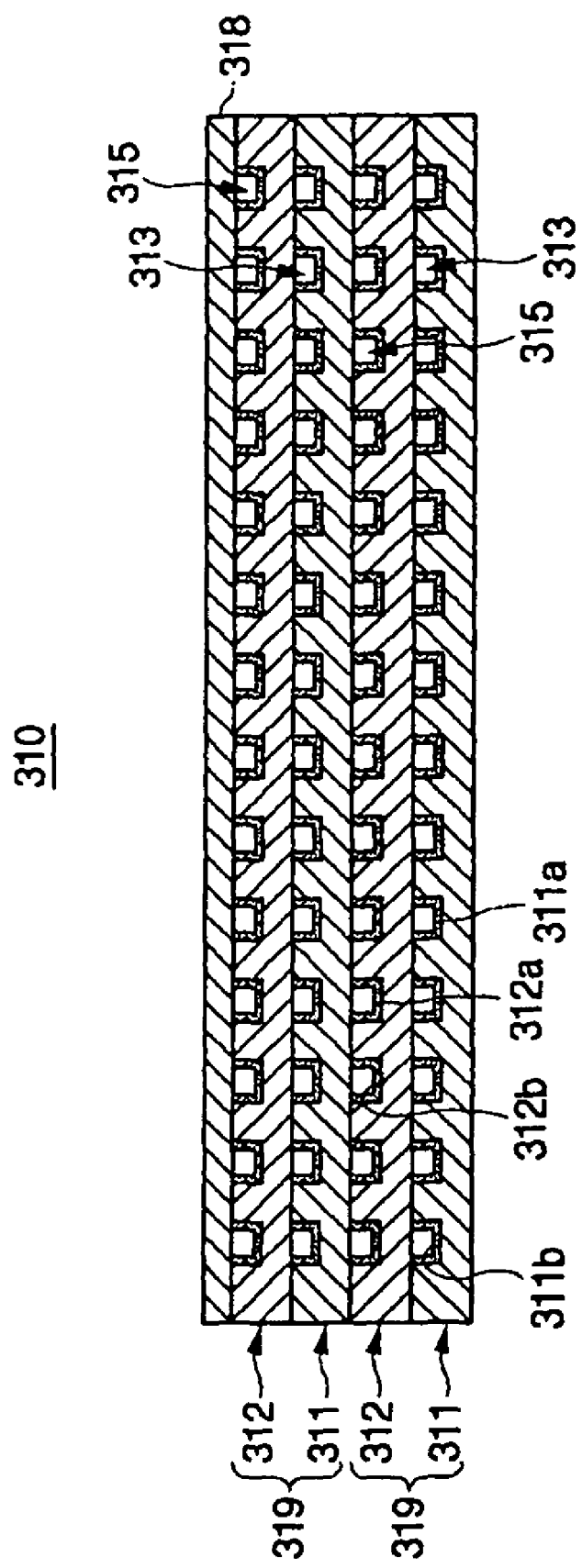
FIG. 7 is a longitudinal cross sectional view of the reactor body shown in FIG. 6.

FIG. 5 is an exploded perspective view of a reactor body 310 of the fuel reformer 300 shown in FIG. 4. FIG. 6 is a perspective view showing a structure in which the reactor body 310 shown in FIG. 4 is combined. FIG. 7 is a longitudinal cross sectional view of the reactor body 310 shown in FIG. 4.

Referring to FIGS. 5 to 7, the reactor body 310, according to the third embodiment, includes a first reaction substrate (or plate) 311 provided with a first channel 311a for allowing the first reactant to flow on a surface thereof and a second reaction substrate 312 provided with a second channel 312a for allowing the second reactant to flow on a surface thereof.

Here, the first and second reaction substrates 311 and 312 are rectangular plates with certain (or predetermined) width and length and are made of metal such as aluminum, stainless steel, copper, nickel, and/or iron having a relatively high thermal conductivity.

The first reaction substrate 311 is used to generate thermal energy with a certain (or predetermined) temperature range (a temperature range needed for the reforming reaction of the reactant) of from about 600° C. to about 700° C. through the oxidation reaction of the first reactants and supply the thermal energy to the second reaction substrate 312.

The first reaction substrate 311 includes the plurality of first channels 311a on an upper surface thereof. The first channels 311a may be formed by using a plurality of ribs that protrude from the upper surface of the first reaction substrate 311.

Then, the first channels 311a have a groove shape that is connected from an end portion of the first reaction substrate 311 to the other end portion thereof. Then, a suitable oxidation catalyst layer 311b for precipitating the oxidation reaction of the first reactant is formed on the surface of the first channels 311a.

The second reaction substrate 312 is used to receive thermal energy from the first reaction substrate 311 and generate the reforming gas containing hydrogen through the reforming reaction of the second reactant using the thermal energy.

The second reaction substrate 312 is adhered to the first reaction substrate 311 and includes the second channels 312a on the upper surface thereof. The second channels 312a may be formed by using a plurality of ribs that protrude from the upper surface of the second reaction substrate 312.

The second channels 312a have a groove (and serpentine) shape that is connected to a pair of manifolds 312c located in the diagonal direction.

Then, a suitable reforming catalyst layer 312b for precipitating the reforming reaction of the second reactant is formed on the surface of the second channel 312a.

In the third embodiment, a unit body (or body unit) 319 is constructed by adhering the lower surface of the second reaction substrate 312 to the upper surface of the first reaction substrate 311. The reactor body 310 may be constructed by sequentially adhering the unit bodies 319 to one another. Then, a cover plate 318 is adhered to the upper surface of the second reaction substrate 312 located at the top of the reactor body 310.

Alternatively, the reactor body 310 may include a single unit body 319. Then, the cover plate 318 is adhered to the upper surface of the second reaction substrate 312 that is the upper surface of the unit body 319.

Here, the first and second reaction substrates 311 and 312, and the cover plate 318 are adhered to one another by using a suitable bonding member such as a bolt and a nut or by using a suitable bonding method such as welding and/or brazing methods.

Accordingly, in the reactor body 310, the first and second reaction substrates 311 and 312 are adhered to each other to form first paths 313 constructed by using the first channels 311a of the first reaction substrate 311 and the adhered surface of the second reaction substrate 312 for allowing the first reactant to flow.

Then, since the first channels 311a are connected from an end portion of the first reaction substrate 311 to the other end portion thereof, the first paths 313 include a plurality of injection holes 313a that are openings located at an end portion of the reactor body 310 and a plurality of discharging holes 313b (referring to FIG. 8) that are openings located at the other end portion thereof.

In addition, in the reactor body 310, the lower surface of the first reaction substrate 311 is adhered to the upper surface of the second reaction substrate 312, and the cover plate 318 is adhered to the upper surface of the second reaction substrate located at the top of the reactor body 310 to form second paths 315 (constructed by using the second channels 312a and the adhered surface of the cover plate 318) which allow the second reactant to flow.

Because the oxidation catalyst layer 311b of the first reaction substrate 311 cannot oxidize the first reactant at room temperature, when the fuel reformer 300 having the aforementioned structure is initially driven, the oxidation catalyst layer 311b needs to be preheated to within the temperature range in which the oxidation reaction of the first reactant starts.

As shown in FIG. 4, the fuel reformer 300 includes a preheating unit 350 for preheating the reactor body 310 by igniting and burning the first reactant.

Figure 8:
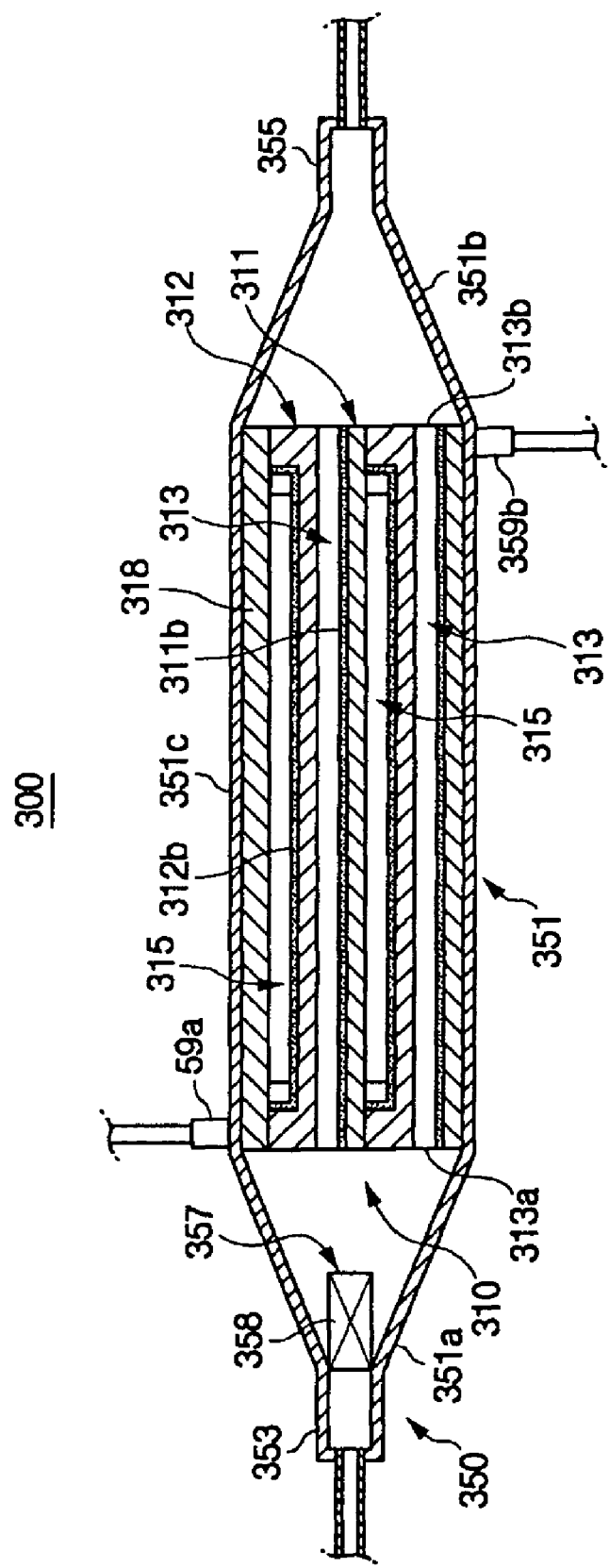
FIG. 8 is a transverse cross sectional view of the fuel reformer shown in FIG. 4.

FIG. 8 is a transverse cross sectional view of FIG. 4. Referring to FIG. 8, when the fuel reformer 300 is initially driven, the preheating unit 350 ignites and burns the first reactant, and supplies the thermal energy caused by burning the first reactant to the first reaction substrate 311, thereby preheating the oxidation catalyst layer 311b of the first reaction substrate 311 to within the reaction starting temperature range of from about 150° C. to about 300° C.

Specifically, the preheating unit 350 includes a housing 351 for enclosing the reactor body 310 and a burner 357, which is located in the housing 351, for igniting and burning the first reactant at the outside of the reactor body 310.

In the present embodiment, the housing 351 is a case for enclosing the reactor body 310 and is made of a suitable heat insulating material to prevent the thermal energy from being released out of the housing 351.

In the housing 351, a first portion 351a having a horn shape is formed at an end portion of the reactor body 310, a second portion 351b having a horn shape is formed at the other end portion of the reactor body 310, and a third portion 351c is adhered to the reactor body 310 except at the end portions.

Since the first portion 351a is integrated into one side of the third portion 351c, the first portion 351a has a shape of which the cross section decreases from a side of the third portion 351c so that a certain (or predetermined) inner space is formed at the end portion of the reactor body 310 at which the injection hole 313a of the first path 313 is formed.

Since the second portion 351b is formed at the other end of the third portion 351c, the second portion 351b has a shape of which the cross section decreases from the other side of the third portion 351c so that a certain (or predetermined) inner space is formed at the other end portion of the reactor body 310 at which the discharging hole 313b of the first path 313 is formed.

The first portion 351a has a horn shape in order to diffuse the first reactant, which is injected into the inner space of the first portion 351a through the first injection hole 353, described in more detail below, in the direction in which the cross section of the first portion 351a increases and inject the first reactant into the injection hole 313a of the first path 313.

In addition, the second portion 351b has the horn shape in order to easily discharge the combustion gas and the reaction gas through the first discharging hole 355 (described in more detail below) by collecting the combustion gas of the first reactant, which is generated by burning the first reactant using the burner 357 (described in more detail below), injected into the first path 313 through the injection hole 313a of the first path 313, and discharged through the discharging hole 313b of the first path 313, and the reaction gas of the first reactant, which is injected into the first path 313 through the injection hole 313a of the first path 313, oxidized by the oxidation catalyst layer 311b, and discharged through the discharging hole 313b of the first path 313.

In the aforementioned housing 351, the first injection hole 353 for injecting the first reactant into the inner space of the first portion 351a is formed in the first portion 351a.

The first injection hole 353 is formed in the pointed portion of the first portion 351a. In addition, the first discharging hole 355 for discharging the combustion gas of the first reactant burned by the burner 357 and the reaction gas of the first reactant oxidized by the oxidation catalyst layer 311b of the first reaction substrate 311 is formed in the second portion 351b. The first discharging hole 355 is formed in the pointed portion of the second portion 351b.

As described above, the burner 357 includes a torch 358, which is disposed in the first portion 351a and connected to the first injection hole 353, for igniting and burning the first reactant that is injected into the inner space of the first portion 351a through the first injection hole 353.

The torch 358 includes an igniter plug (not shown) for igniting the first reactant. The igniter plug is a suitable igniter plug controlled by an additional controller (not shown) to generate a flame.

Also, FIG. 8 shows a second injection hole 59a for injecting the second reactant into the second path 315 of the reactor body 310, and a second discharging hole 359b for discharging the reforming gas generated when the second reactant passing through the second path 315 generates the reforming reaction using the reforming catalyst layer 312b.

The aforementioned second injection hole 59a and the second discharging hole 359b are connected to the manifold 312c of the second reaction substrate 312 shown in FIG. 5.

A method of driving the fuel reformer 300 having the aforementioned structure will be described in more detail below.

When the fuel reformer 300 is initially driven, the first reactant is injected into the inner space of the first portion 351a through the first injection hole 353 of the housing 351.

The igniter plug (not shown) of the torch 358 generates a flame to ignite the first reactant injected into the inner space of the first portion 351a. Then, the first reactant is burned in the inner space of the first portion 351a to generate the certain (or predetermined) thermal energy.

Accordingly, a high temperature combustion gas generated by burning the first reactant is injected into the first path 313 through the injection hole 313a of the first path 313 to flow along the first path 313 and discharged through the discharging hole 313b of the first path 313, thereby supplying the thermal energy to the oxidation catalyst layer 311b of the first reaction substrate 311.

The oxidation catalyst layer 311b of the first reaction substrate 311 is preheated to within the reaction starting temperature range (from about 150° C. to about 300° C.) in which the oxidation reaction of the first reactant starts.

Then, the combustion gas discharged through the discharging hole 313b of the first path 313 is collected in the inner space of the second portion 351b and discharged out of the housing 351 through the first discharging hole 355.

Subsequently, when the fuel reformer 300 is normally driven, since the first reactant is continuously supplied to the inner space of the first portion 351a through the first injection hole 353 of the housing 351, the igniter plug is controlled by the controller to not operate.

When the fuel reformer 300 is normally driven, the first reactant is injected from the inner space of the first portion 351a into the first path 313 through the injection hole 313a of the first path 313. Then, in the first reaction substrate 311, the first reactant flowing along the first path 313 is oxidized by using the oxidation catalyst layer 311b to generate the thermal energy for maintaining the certain (or predetermined) temperature range (or reforming temperature range) of from about 600° C. to about 700° C. needed for the reforming reaction of the second reactant.

Here, since the first reaction substrate 311 is adhered to the second reaction substrate 312, the thermal energy is transferred to the second reaction substrate 312 through the first reaction substrate 311, thereby being supplied to the reforming catalyst layer 312b of the second reaction substrate 312.

The reaction gas of the first reactant oxidized by the oxidation catalyst layer 311b is discharged through the discharging hole 313b of the first path 313, collected in the inner space of the second portion 351b, and discharged out of the housing 351 through the first discharging hole 355.

After the aforementioned processes, the second reactant is supplied to the second path 315 of the reactor body 310 through the second injection hole 59a. Then, when the second reaction substrate 312 absorbs the thermal energy generated in the first reaction substrate 311, the reforming reaction of the second reactant using the reforming catalyst layer 312b is performed to generate the reforming gas containing hydrogen.

Accordingly, since the reforming gas is discharged to the stack through the second discharging hole 359b, in the stack, the oxidation reaction of hydrogen contained in the reforming gas and a reduction reaction of separately supplied air are performed to output the certain (or predetermined) electric energy.

As described above, according to an embodiment of the present invention, since the fuel reformer includes the auxiliary heat source for preheating the oxidation catalyst by igniting and burning the fuel when the fuel reformer is initially driven, the fuel reformer can generate the thermal energy through the oxidation reaction of the fuel by using the oxidation catalyst when the fuel reformer normally operates.

Accordingly, since the oxidation catalyst is preheated by igniting and burning the fuel only when the fuel reformer is initially driven, the initial driving time of the fuel reformer is decreased, thereby improving energy efficiency of the fuel reformer, and the durability of the auxiliary heat source against a flame is improved, thereby increasing the lifetime of the fuel reformer.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A fuel reformer comprising:
   a reactor body including a plurality of reaction substrates configured to generate thermal energy through an oxidation reaction of a first reactant including a fuel, the reactor body further being configured to generate a reforming gas through a reforming reaction of a second reactant including the fuel; and
   a preheating unit configured to ignite and burn the first reactant in order to preheat the reactor body, the preheating unit comprising:
      a housing enclosing the reactor body; and
      a burner disposed in the housing to ignite and burn the first reactant external to the reactor body,
      wherein the housing has:
         a first injection hole located adjacent to the burner and configured to supply the second reactant to the plurality of reaction substrates; and
         a second injection hole located adjacent to the burner and configured to supply the first reactant through the burner, and
      wherein the reactor body has:
         a third injection hole at a first side of the reactor body for injecting the burnt first reactant into the reactor body; and
         a discharge hole at a second side of the reactor body for discharging the oxidized first reactant, the second side facing oppositely away from the first side.

2. The fuel reformer of claim 1, wherein the third injection hole is located between the burner and the plurality of reaction substrates.

3. The fuel reformer of claim 1, wherein the burner is located between the first injection hole and the second injection hole.

4. A fuel reformer comprising:
   one or more first reaction substrates including a plurality of first channels for allowing a first reactant including a fuel to flow and in which an oxidation catalyst layer is formed on a surface of the first channels;
   one or more second reaction substrates including a plurality of second channels for allowing a second reactant including the fuel to flow and a reforming catalyst layer fanned on a surface of the second channels;

a reactor body constructed by adhering one of the first reaction substrates to one of the second reaction substrates; and a preheating unit configured to ignite and burn the first reactant in order to preheat the oxidation catalyst layer to within a reaction starting temperature range, the preheating unit comprising:

a housing for enclosing the reactor body; and a burner disposed in the housing to ignite and burn the first reactant external to the reactor body, wherein the housing has an injection hole adjacent to the burner, wherein the injection hole is configured to supply the first reactant through the burner and to the plurality of reaction substrates, and wherein the reactor body has:

a second injection hole at a first side of the reactor body for injecting the first reactant into the reactor body; and a discharge hole at a second side of the reactor body for discharging a combustion gas of the first reactant, the second side facing oppositely away from the first side.

5. The fuel reformer of claim 4, wherein the reactor body includes one or more unit bodies, each of the unit bodies being constructed by adhering one of the first reaction substrates to one of the second reaction substrates.

6. The fuel reformer of claim 5, wherein the reactor body includes a cover plate adhered to the second reaction substrate of one of the unit bodies.

7. The fuel reformer of claim 5, wherein the reactor body is constructed by successively adhering the unit bodies to one another.

8. The fuel reformer of claim 7, wherein the reactor body includes a cover plate adhered to a top most one of the second reaction substrates disposed at the top of the reactor body.

9. The fuel reformer of claim 4, wherein the housing comprises:

a first portion having a horn shape located at a first end portion of the reactor body;

a second portion having a horn shape located at a second end portion of the reactor body; and a third portion adhered to the reactor body with the exception of the first end portion of the reactor body and the second end portion of the reactor body.

10. The fuel reformer of claim 9, wherein the burner is disposed in the first portion.

11. The fuel reformer of claim 9, wherein the housing comprises a discharging hole formed in the second portion and for discharging a combustion gas of the first reactant burned by the burner during start-up and for discharging a reaction gas of the first reactant oxidized by the oxidation catalyst layer after start-up.

12. The fuel reformer of claim 4, wherein the reactor body includes a path constructed by using the first channels and the adhered surface of the second reaction substrate to allow the first reactant to flow through, and wherein the path includes a plurality of the second injection holes formed at a first end portion of the reactor body and a plurality of the discharging holes formed at a second end portion of the reactor body connected with the injection holes.

13. The fuel reformer of claim 4, wherein the reaction starting temperature range of the oxidation catalyst layer is from about 150° C. to about 300° C.

14. The fuel reformer of claim 4, wherein the first reaction substrate generates thermal energy with a temperature range from about 600° C. to about 700° C. through the oxidation reaction of the first reactant.

* * * * *

UNITED STATES PATENT AND TRADEMARK OFFICE
CERTIFICATE OF CORRECTION

PATENT NO.        : 8,017,088 B2
APPLICATION NO.   : 11/528976
DATED             : September 13, 2011
INVENTOR(S)       : Sung-Chul Lee et al.

It is certified that error appears in the above-identified patent and that said Letters Patent is hereby corrected as shown below:

In the Claims

Column 12, Claim 4, line 67.        Delete "fanned"
                                    Insert -- formed --

Signed and Sealed this
Twenty-fourth Day of July, 2012

David J. Kappos
*Director of the United States Patent and Trademark Office*